US011953075B2

(12) United States Patent
Kusukawa et al.

(10) Patent No.: US 11,953,075 B2
(45) Date of Patent: Apr. 9, 2024

(54) DAMPER DEVICE (71) Applicant: Hitachi Astemo, Ltd., Hitachinaka (JP)

(72) Inventors: Junpei Kusukawa, Tokyo (JP);
Michihiro Asanuma, Hitachinaka (JP);
Motohiro Hirao, Hitachinaka (JP);
Hiroshi Ooka, Hitachinaka (JP);
Tatsuro Nambu, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 653 days.

(21) Appl. No.: 16/978,089

(22) PCT Filed: Oct. 16, 2018

(86) PCT No.: PCT/JP2018/038429
§ 371 (c)(1),
(2) Date: Sep. 3, 2020

(87) PCT Pub. No.: WO2019/187268
PCT Pub. Date: Oct. 3, 2019

(65) Prior Publication Data
US 2021/0010560 A1    Jan. 14, 2021

(30) Foreign Application Priority Data
Mar. 26, 2018    (JP) .............................. JP2018-058497

(51) Int. Cl.
*F16F 9/53* (2006.01)
*B60G 13/08* (2006.01)
(Continued)

(52) U.S. Cl.
CPC .............. *F16F 9/532* (2013.01); *F16F 9/185* (2013.01); *B60G 13/08* (2013.01); *B60G 17/08* (2013.01);
(Continued)

(58) Field of Classification Search
CPC .......... F16F 9/532; F16F 9/185; F16F 9/3235; F16F 2222/06; F16F 2222/12;
(Continued)

(56) References Cited

U.S. PATENT DOCUMENTS 1,598,923 A * 9/1926 Mason .................. F16F 13/007
267/125
2,916,307 A * 12/1959 Peters ...................... F16J 3/048
285/119

(Continued)

FOREIGN PATENT DOCUMENTS

CN      1228192 A      9/1999
DE      69010559 T2    2/1995

(Continued)

OTHER PUBLICATIONS

Chinese Office Action dated Apr. 6, 2021 for Chinese Patent Application No. 201880084561.0.

(Continued)

*Primary Examiner* — Thomas J Williams
*Assistant Examiner* — James K Hsiao
(74) *Attorney, Agent, or Firm* — Volpe Koenig (57) ABSTRACT

A damper device that suppresses arc discharge between electrodes generated by bubbles in an electro-rheological fluid, includes an inner tube housed in an outer tube forming an outer shell of a damper device. An electrode tube is arranged between the outer tube and the inner tube. An electro-rheological fluid is sealed in the outer tube. The inner tube and the electrode tube constitute a cathode and an anode, respectively, and apply a voltage to the electro-rheological fluid located between the inner tube and the electrode tube. An insulating layer is provided on a surface of the electrode tube on a side facing the inner tube or on a surface of the inner tube on a side facing the electrode tube.

(Continued)

When a maximum voltage applied to the electro-rheological fluid is Vmax (V), a thickness t (m) of the insulating layer is set to satisfy Formula (1).

11 Claims, 6 Drawing Sheets

(51) Int. Cl.
 *B60G 17/08* (2006.01)
 *F16F 9/18* (2006.01)
 *F16F 9/32* (2006.01)
(52) U.S. Cl.
 CPC ...... *B60G 2202/24* (2013.01); *B60G 2204/62* (2013.01); *B60G 2206/41* (2013.01); *B60G 2206/70* (2013.01); *B60G 2500/104* (2013.01); *B60G 2600/182* (2013.01); *B60G 2600/73* (2013.01); *B60G 2800/162* (2013.01); *F16F 9/3235* (2013.01); *F16F 2222/06* (2013.01); *F16F 2222/12* (2013.01); *F16F 2224/02* (2013.01); *F16F 2224/043* (2013.01); *F16F 2228/007* (2013.01); *F16F 2228/066* (2013.01); *F16F 2230/18* (2013.01); *F16F 2230/48* (2013.01); *F16F 2232/08* (2013.01); *F16F 2234/02* (2013.01)
(58) Field of Classification Search
 CPC ............ F16F 2224/02; F16F 2224/043; F16F 2228/007; F16F 2228/066; F16F 2230/18; F16F 2230/48; F16F 2232/08; F16F 2234/02; B60G 13/08; B60G 17/08; B60G 2202/24; B60G 2204/62; B60G 2206/41; B60G 2206/70; B60G 2500/104; B60G 2600/182
 See application file for complete search history.

(56) References Cited

U.S. PATENT DOCUMENTS

| | | | | |
|---|---|---|---|---|
| 4,005,858 A * | 2/1977 | Lochner | ................... | F16F 13/08 267/152 |
| 4,351,515 A * | 9/1982 | Yoshida | ................... | F16F 9/535 267/225 |
| 4,509,730 A * | 4/1985 | Shtarkman | ............ | F16F 13/002 267/152 |
| 4,773,632 A * | 9/1988 | Hartel | ..................... | F16F 13/30 267/141.1 |
| 4,790,522 A * | 12/1988 | Drutchas | ................... | F16F 9/46 188/266.2 |
| 4,838,581 A * | 6/1989 | Oda | ........................ | F28F 21/04 285/422 |
| 5,005,326 A * | 4/1991 | Ishimaru | ............... | E04H 9/0215 248/580 |
| 5,012,740 A * | 5/1991 | Hardt | ................... | H01H 35/142 102/216 |
| 5,288,535 A | 2/1994 | Kanbara et al. | | |
| 5,462,361 A * | 10/1995 | Sato | .................... | B23Q 11/0032 188/267 |
| 5,497,861 A * | 3/1996 | Brotz | ...................... | F16F 13/30 267/140.5 |
| 5,590,746 A * | 1/1997 | Brotz | ...................... | F16F 13/30 188/267.1 |
| 5,873,438 A * | 2/1999 | Osterberg | ................. | F16F 7/10 384/126 |
| 5,979,618 A * | 11/1999 | Sieg | .......................... | F16F 1/40 188/322.19 |
| 5,979,882 A * | 11/1999 | Osterberg | ............... | F16F 9/103 267/221 |
| 6,029,783 A * | 2/2000 | Wirthlin | .................. | F16F 9/532 188/267.1 |
| 6,129,185 A * | 10/2000 | Osterberg | ............... | F16F 9/103 188/267.2 |
| 6,385,327 B1 * | 5/2002 | D'Hoogh | ............... | H04R 9/043 181/171 |
| 7,140,081 B2 * | 11/2006 | Browne | .................... | F16B 5/07 24/442 |
| 7,971,397 B2 * | 7/2011 | Georgakis | ............. | E04H 9/0215 52/167.2 |
| 8,313,296 B2 * | 11/2012 | Jolly | ...................... | B64C 27/001 416/61 |
| 8,349,154 B2 | 1/2013 | Lu et al. | | |
| 10,208,828 B2 * | 2/2019 | Gaudet | ................... | F16F 9/512 |
| 10,457,107 B2 * | 10/2019 | Lindemann | .......... | B60G 15/063 |
| 11,002,335 B2 * | 5/2021 | Ghosh | ................... | F01D 25/164 |
| 2003/0071187 A1 * | 4/2003 | Herren | ................. | F16F 15/0275 248/638 |
| 2005/0199455 A1 * | 9/2005 | Browne | .................. | F16F 9/466 188/266.4 |
| 2012/0161579 A1 * | 6/2012 | Browne | .................. | F03G 7/065 60/527 |
| 2016/0059656 A1 | 3/2016 | Funke et al. | | |
| 2018/0009475 A1 * | 1/2018 | Khoury | .................. | B62D 7/144 |
| 2018/0066390 A1 * | 3/2018 | Yu | ........................... | D06F 37/24 |
| 2018/0180131 A1 * | 6/2018 | Inoue | ..................... | F16F 7/1011 |
| 2019/0162267 A1 * | 5/2019 | Barber | ...................... | F16F 9/53 |
| 2020/0086708 A1 * | 3/2020 | Cervantes | ................. | F16F 9/19 |
| 2020/0102996 A1 * | 4/2020 | Kurabayashi | ......... | F16F 15/022 |

FOREIGN PATENT DOCUMENTS

| | | |
|---|---|---|
| DE | 102007026378 A1 | 11/2008 |
| DE | 102011117626 B3 | 1/2013 |
| DE | 102015003176 A1 | 10/2016 |
| JP | 03-113129 A | 5/1991 |
| JP | 06-010985 A | 1/1994 |
| JP | 07-190099 A | 7/1995 |
| JP | 2016-515184 A | 5/2016 |

OTHER PUBLICATIONS

German Office Action dated Sep. 13, 2021 for German Patent Application No. 112018006096.9.
International Search Report, PCT/JP2018/038429, dated Dec. 25, 2018, 2 pgs.

* cited by examiner

DAMPER DEVICE

TECHNICAL FIELD

The present invention relates to a damper device used for a vehicle or the like.

BACKGROUND ART

In general, a vehicle such as an automobile is provided with a damper device typified by a hydraulic shock absorber between a vehicle body side (above a spring) and each wheel side (below the spring). As a damper device that changes a damping characteristic, there is a technique of filling an inside of a damper device with an electro-rheological fluid. In the damper device using the electro-rheological fluid, the damping characteristic is changed by applying a voltage to an electrode arranged in the damper device to apply an electric field to the electro-rheological fluid. Examples of such a technique include PTL 1 and PTL 2.

PTL 1 discloses a technique of forming an insulating layer on a contact surface with an electro-rheological fluid in order to prevent a decrease of a thickening effect due to electrochemical deterioration and elution and corrosion of electrode metal due to electrochemical reactions when a voltage is applied to the electro-rheological fluid.

Further, PTL 2 discloses a technique of forming an insulating layer, which has a film thickness at a ratio of 0.001 to 0.1 when an electrode spacing distance is 1 and has a relative dielectric constant being twice or less that of a dispersion medium, is formed on a contact surface with an electro-rheological fluid in addition to the above-described PTL 1 in order to obtain a high thickening effect by the electro-rheological fluid.

CITATION LIST

Patent Literature

PTL 1: JP H3-113129 A
PTL 2: JP H7-190099 A

SUMMARY OF INVENTION

Technical Problem

There is a case where an electro-rheological fluid moves by a compression stroke and an extension stroke of a piston in a damper device, and at this time, the electro-rheological fluid entrains a gas in the damper device. As a result, bubbles are generated in the electro-rheological fluid. In the damper device using the electro-rheological fluid, a high voltage of 3,000 V or more is applied to the electro-rheological fluid arranged between anode and cathode electrodes, and there is a case where dielectric breakdown occurs due to the bubbles generated in the electro-rheological fluid so that arc discharge in which a large current flows between the anode and cathode electrodes is generated.

In the above-described PTL 1 and PTL 2, the insulating layer is formed on the electrode in contact with the electro-rheological fluid, but no consideration is given to suppression of the arc discharge. For this reason, there are problems that the arc discharge is generated due to the bubbles generated in the electro-rheological fluid, the electrode is consumed, and the electro-rheological fluid deteriorates.

An object of the present invention is to solve the above-described problems and to provide a damper device capable of suppressing generation of arc discharge.

Solution to Problem

A feature of the present invention in order to achieve the above object is a damper device including: a piston rod; an outer tube housing the piston rod; an electro-rheological fluid provided between the outer tube and the piston rod; and a voltage applying mechanism that is provided between the outer tube and the piston rod and applies a voltage to the electro-rheological fluid. The voltage applying mechanism includes an anode and a cathode. The electro-rheological fluid is located between the anode and the cathode. An insulating layer is provided on a surface of the anode on a side facing the cathode or on a surface of the cathode on a side facing the anode. A thickness t (m) of the insulating layer satisfies the following Formula (1) when a maximum voltage applied to the electro-rheological fluid is Vmax (V).

$$t \geq 2.5 \times 10^{-8} \times V\text{max} \qquad \text{Formula (1)}$$

Advantageous Effects of Invention

According to this invention, the damper device suppressing the generation of arc discharge can be provided.

DESCRIPTION OF EMBODIMENTS

Hereinafter, embodiments of a damper device according to the present invention will be described with reference to the drawings. The present invention is not limited to the following embodiments, but includes various modifications and application examples within a technical concept of the present invention.

First Embodiment

Figure 1:
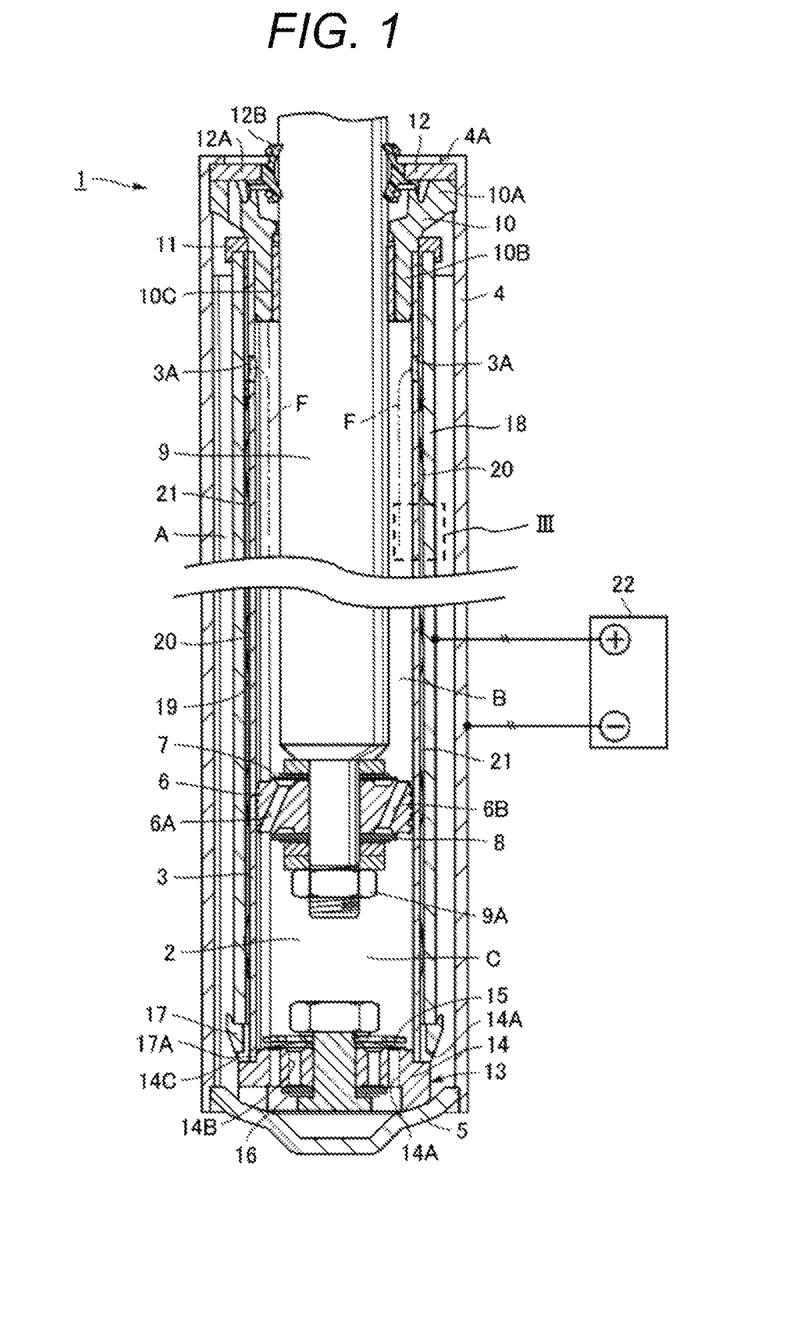
FIG. 1 is a longitudinal cross-sectional view of a damper device according to a first embodiment of the present invention.
Figure 2:
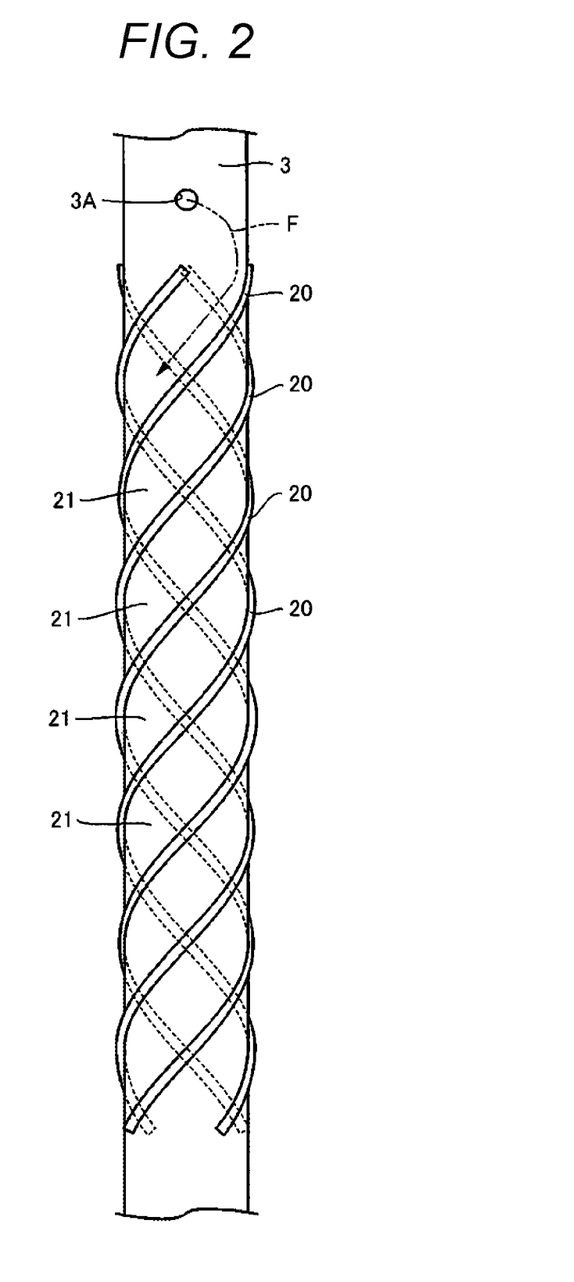
FIG. 2 is a front view illustrating a relationship between an inner tube and a flow channel according to the first embodiment of the present invention.

Hereinafter, a damper device according to a first embodiment of the present invention will be described with reference to the drawings. FIG. 1 is a longitudinal cross-sectional view of the damper device according to the first embodiment of the present invention. FIG. 2 is a front view illustrating a relationship between an inner tube and a flow channel according to the first embodiment of the present invention.

In FIG. 1, a damper device 1 is configured as a damping force adjustment type hydraulic shock absorber (semi-active damper) using a functional fluid (that is, an electro-rheological fluid 2) as a working fluid such as hydraulic oil sealed therein. The damper device 1 forms a suspension device for a vehicle together with a suspension spring (not illustrated) configured using, for example, a coil spring. Incidentally, a description will be given using one end side of the damper device 1 in the axial direction as a "lower end" side and the other end side in the axial direction as an "upper end" side in the following description, but the one end side in the axial direction of the damper device 1 may be referred to as the "upper end" side, and the other end side in the axial direction may be referred to as the "lower end" side.

The damper device 1 includes an inner tube 3, an outer tube 4, a piston 6, a piston rod 9, a bottom valve 13, an electrode tube 18, and the like. The inner tube 3 is formed as a cylindrical tube body extending in the axial direction, and the electro-rheological fluid 2 as a functional fluid is sealed therein. Further, the piston rod 9 is inserted into the inner tube 3, and the outer tube 4 and the electrode tube 18 are provided outside the inner tube 3 so as to be coaxial.

The inner tube 3 is fitted and attached to a valve body 14 of the bottom valve 13 on a lower end side, and is fitted and attached to a rod guide 10 on an upper end side. The inner tube 3 has a plurality (for example, four) of oil holes 3A which are always in communication with an electrode passage 19 are formed to be spaced apart in the circumferential direction as lateral holes in the radial direction. That is, a rod-side oil chamber B in the inner tube 3 communicates with the electrode passage 19 through the oil hole 3A.

The outer tube 4 forms an outer shell of the damper device 1 and is formed as a cylindrical body. The outer tube 4 is provided at an outer periphery of the electrode tube 18 and forms a reservoir chamber A communicating with the electrode passage 19 between the outer tube 4 and the electrode tube 18. In this case, a lower end side of the outer tube 4 is a closed end closed by a bottom cap 5 using welding means or the like. The bottom cap 5 and the valve body 14 of the bottom valve 13 constitute a base member.

An upper end side of the outer tube 4 is an open end. On the open end side of the outer tube 4, for example, a swaging portion 4A is formed to be bent radially inward. The swaging portion 4A holds an outer peripheral side of an annular plate body 12A of a seal member 12 in a state of preventing detachment.

Here, the inner tube 3 and the outer tube 4 constitute a cylinder, and a working fluid is sealed in the cylinder. In the present embodiment, the electro-rheological fluid (ERF) 2 which is a kind of functional fluid is used as the fluid filling (sealed in) the inside of the cylinder, that is, the working fluid to serve as working oil. Incidentally, FIGS. 1 and 2, the sealed electro-rheological fluid 2 is illustrated in colorless and transparent. In this manner, it is configured such that the outer tube 4 houses the piston rod 9, and the electro-rheological fluid 2 is arranged between the outer tube 4 and the piston rod 9.

The electro-rheological fluid 2 is a fluid (functional fluid) whose properties change according to an electric field (voltage). That is, the electro-rheological fluid 2 is arranged in an electric field which is a space to which a voltage is applied, and the viscosity thereof changes according to the applied voltage, thereby changing a flow resistance (damping force). The electro-rheological fluid 2 contains, for example, base oil made of silicone oil or the like and particles (fine particles) which are mixed (dispersed) in the base oil and whose viscosity can be changed according to a change of an electric field.

As will be described later, the damper device 1 is configured to generate a potential difference in the electrode passage 19 between the inner tube 3 and the electrode tube 18, and controls (adjusts) the generated damping force by controlling the viscosity of the electro-rheological fluid 2 passing through the electrode passage 19.

The annular reservoir chamber A serving as a reservoir is formed between the inner tube 3 and the outer tube 4, more specifically, between the electrode tube 18 and the outer tube 4. A gas that becomes a working gas together with the working fluid is sealed in the reservoir chamber A. This gas may be air at an atmospheric pressure, or a gas such as a compressed nitrogen gas may be used. The gas in the reservoir chamber A is compressed during contraction (a retraction stroke) of the piston rod 9 to compensate for the volume of the piston rod 9 that has entered.

The piston 6 is provided to be slidable in the inner tube 3. The piston 6 divides the inside of the inner tube 3 into a rod-side oil chamber B serving as a first chamber and a bottom-side oil chamber C serving as a second chamber. In the piston 6, a plurality of oil passages 6A and 6B that allow the rod-side oil chamber B and the bottom-side oil chamber C to communicate with each other are formed to be spaced apart in the circumferential direction.

Here, the damper device 1 according to the present embodiment has a uniflow structure that flows only in one direction. For this reason, the electro-rheological fluid 2 in the inner tube 3 always flows in one direction (that is, a direction of an arrow F indicated by the two-dot chain line in FIG. 1) from the rod-side oil chamber B (that is, the oil hole 3A of the inner tube 3) toward the electrode passage 19 in both the retraction stroke and an extension stroke of the piston rod 9.

In order to realize such a uniflow structure, a retraction-side check valve 7, which is open when the piston 6 slides downward in the inner tube 3 in the contraction stroke (retraction stroke) of the piston rod 9 and is closed at the other time, for example, is provided on an upper end surface of the piston 6. The retraction-side check valve 7 allows an oil liquid (the electro-rheological fluid 2) in the bottom-side oil chamber C to flow in each of the oil passages 6A toward the rod-side oil chamber B, and prevents the oil liquid from flowing in the opposite direction. That is, the retraction-side check valve 7 allows the electro-rheological fluid 2 to flow only from the bottom-side oil chamber C to the rod-side oil chamber B.

On a lower end surface of the piston 6, for example, a disc valve 8 on the expansion side is provided. When the piston 6 slides upward in the inner tube 3 in the expansion stroke (extension stroke) of the piston rod 9, the disc valve 8 on the expansion side is open if the pressure inside the rod-side oil chamber B exceeds a relief set pressure, and releases the pressure at this time toward the bottom-side oil chamber C through each of the oil passages 6B.

The piston rod 9 as a rod extends in the inner tube 3 in the axial direction (which is the same direction as each central axis of the inner tube 3 and the outer tube 4, and further, the damper device 1 and is the vertical direction of FIGS. 1 and 2). That is, the piston rod 9 has a lower end connected (fixed) to the piston 6 in the inner tube 3 and an upper end extending to the outside of the inner tube 3 and the outer tube 4 through the rod-side oil chamber B. In this case, the piston 6 is fixed (fastened) to a lower end side of the piston rod 9 using a nut 9A or the like. On the other hand, an upper end side of the piston rod 9 protrudes outside through the rod guide 10. Incidentally, the lower end of the piston rod 9 may be further extended so as to protrude outward from a bottom portion (for example, the bottom cap 5), thereby forming a so-called double rod.

A stepped cylindrical rod guide 10 is fitted on the upper end sides of the inner tube 3 and the outer tube 4 so as to close the upper end sides of the inner tube 3 and the outer tube 4. The rod guide 10 supports the piston rod 9, and is formed as a tubular body having a predetermined shape, for example, by performing molding, cutting, or the like on a metal material, a hard resin material, or the like. The rod guide 10 positions an upper portion of the inner tube 3 and an upper portion of the electrode tube 18 at the center of the outer tube 4. At the same time, the rod guide 10 guides the piston rod 9 to be slidable in the axial direction on an inner peripheral side thereof.

Here, the rod guide 10 is formed in a stepped cylindrical shape by an annular large-diameter portion 10A that is located on the upper side and inserted into an inner peripheral side of the outer tube 4, and a short tubular small-diameter portion 10B which is located on a lower end side of the large-diameter portion 10A and inserted into an inner peripheral side of the inner tube 3. A guide portion 10C that guides the piston rod 9 to be slidable in the axial direction is provided on an inner peripheral side of the small-diameter portion 10B of the rod guide 10. The guide portion 10C is formed by, for example, applying ethylene tetrafluoride coating to an inner peripheral surface of a metal tube.

On the other hand, an annular holding member 11 is fitted and attached between the large-diameter portion 10A and the small-diameter portion 10B on an outer peripheral side of the rod guide 10. The holding member 11 holds the electrode tube 18 with the upper end side positioned in the axial direction. The holding member 11 is made of, for example, an electrically insulating material (isolator), and keeps an electrically insulated state between the inner tube 3 and each of the rod guide 10 and the electrode tube 18.

An annular seal member 12 is provided between the large-diameter portion 10A of the rod guide 10 and the swaging portion 4A of the outer tube 4. The seal member 12 includes the metallic annular plate body 12A provided with a hole through which the piston rod 9 is inserted at the center, and an elastic body 12B made of an elastic material such as rubber fixed to the annular plate body 12A by means such as baking. The seal member liquid-tightly and air-tightly seals a portion between the seal member 12 and the piston rod 9 as the inner periphery of the elastic body 12B is in sliding-contact with an outer peripheral side of the piston rod 9.

The bottom valve 13 is provided at the lower end side of the inner tube 3 to be located between the inner tube 3 and the bottom cap 5. The bottom valve 13 allows and blocks the communication between the bottom-side oil chamber C and the reservoir chamber A. For this purpose, the bottom valve 13 includes a valve body 14, an extension-side check valve 15, and a disc valve 16. The valve body 14 defines the reservoir chamber A and the bottom-side oil chamber C between the bottom cap 5 and the inner tube 3.

In the valve body 14, oil passages 14A and 14B that enable the reservoir chamber A and the bottom-side oil chamber C to communicate with each other are formed at intervals in the circumferential direction. A step portion 14C is formed on an outer peripheral side of the valve body 14, and a lower end inner peripheral side of the inner tube 3 is fitted and fixed to the step portion 14C. Further, an annular holding member 17 is fitted to and attached to an outer peripheral side of the inner tube 3 at the step portion 14C.

The extension-side check valve 15 is provided, for example, on an upper surface side of the valve body 14. The extension-side check valve 15 is open when the piston 6 slides upward in the expansion stroke of the piston rod 9, and is closed at the other time. The extension-side check valve 15 allows the oil liquid (electro-rheological fluid 2) in the reservoir chamber A to flow in each of the oil passages 14A toward the bottom-side oil chamber C, and prevents the oil liquid from flowing in the opposite direction. That is, the extension-side check valve 15 allows only the flow of the electro-rheological fluid 2 from the reservoir chamber A to the bottom-side oil chamber C.

The disc valve 16 on the contraction side is provided, for example, on a lower surface side of the valve body 14. When the piston 6 slides downward in the contraction stroke of the piston rod 9, the disc valve 16 on the contraction side is open if the pressure in the bottom-side oil chamber C exceeds the relief set pressure, and releases the pressure at this time toward the reservoir chamber A side through each of the oil passages 14B.

The holding member 17 holds the electrode tube 18 with the lower end side positioned in the axial direction. The holding member 17 is made of, for example, an electrically insulating material (isolator), and keeps an electrically insulated state between the inner tube 3 and each of the valve body 14 and the electrode tube 18. Further, the holding member 17 is formed with a plurality of oil passages 17A that allow the electrode passages 19 to communicate with the reservoir chamber A.

The electrode tube 18 formed of a pressure tube extending in the axial direction is provided outside the inner tube 3, that is, between the inner tube 3 and the outer tube 4. The electrode tube 18 is an intermediate tube between the inner tube 3 and the outer tube 4. The electrode tube 18 is made of a conductive material, and forms a tubular electrode. The electrode tube 18 forms the electrode passage 19 communicating with the rod-side oil chamber B between the electrode tube 18 and the inner tube 3.

That is, the electrode tube 18 is attached to the outer peripheral side of the inner tube 3 via the holding members 11 and 17 provided to be spaced apart in the axial direction (vertical direction). The electrode tube 18 surrounds the outer peripheral side of the inner tube 3 over the entire periphery, and forms an annular passage, that is, the electrode passage 19 as an intermediate passage through which the electro-rheological fluid 2 flows inside the electrode tube 18, that is, between an inner peripheral side of the electrode tube 18 and the outer peripheral side of the inner tube 3. In the electrode passage 19, a plurality of flow channels 21 are formed by a plurality of partition walls 20.

The electrode passage 19 always communicates with the rod-side oil chamber B through the oil hole 3A formed as the lateral hole in the radial direction in the inner tube 3. That is, as the flow direction of the electro-rheological fluid 2 is indicated by the arrow F in FIG. 1, the electro-rheological fluid 2 flows from the rod-side oil chamber B into the electrode passage 19 through the oil hole 3A in both a compression stroke and the extension stroke of the piston 6 the damper device 1. When the piston rod 9 moves forward and backward in the inner tube 3 (that is, while the retraction stroke and the extension stroke are repeated), the electro-rheological fluid 2 that has flowed into the electrode passage 19 flows from the upper end side to the lower end side of the electrode passage 19 in the axial direction with this forward and backward movement. At this time, the electro-rheological fluid 2 in the electrode passage 19 flows through the flow channel 21 between the respective partition walls 20 while being guided by the respective partition walls 20. Then, the electro-rheological fluid 2 that has flowed into the electrode passage 19 flows out from the lower end side of the electrode tube 18 to the reservoir chamber A through the oil passage 17A of the holding member 17.

The electrode passage 19 imparts resistance to the fluid flowing by the sliding of the piston 6 inside the outer tube 4 and the inner tube 3, that is, the electro-rheological fluid 2 serving as the working fluid. For this purpose, the electrode tube 18 is connected to an anode of a battery 22 serving as a power supply, for example, via a high voltage driver (not illustrated) that generates a high voltage. The battery 22 (and the high voltage driver) serves as a voltage supply unit (electric field supply unit), and the electrode tube 18 serves as an electrode that applies a voltage (electric field) to the working fluid which is the fluid in the electrode passage 19, that is, the electro-rheological fluid 2 serving as the functional fluid. In this case, both end sides of the electrode tube 18 are electrically insulated by the electrically insulating holding members 11 and 17. On the other hand, the inner tube 3 is connected to a cathode (ground) via the rod guide 10, the bottom valve 13, the bottom cap 5, the outer tube 4, the high voltage driver, and the like. The electrode tube 18 serving as the anode and the inner tube 3 serving as the cathode constitute a voltage applying mechanism that applies a voltage to the electro-rheological fluid 2. This voltage applying mechanism is provided between the outer tube 4 and the piston rod 9 and applies the voltage to the electro-rheological fluid 2. In the present embodiment, the electrode tube 18 serves as the anode and the inner tube 3 serves as the cathode. However, the electrode tube 18 may serve as the cathode and the inner tube 3 may serve as the anode.

The high voltage driver steps up a DC voltage output from the battery 22 based on a command (high voltage command) output from a controller (not illustrated) configured to variably adjust the damping force of the damper device 1, and supplies (outputs) the stepped-up voltage to the electrode tube 18. As a result, a potential difference corresponding to the voltage applied to the electrode tube 18 is generated between the electrode tube 18 and the inner tube 3, in other words, in the electrode passage 19 so that the viscosity of the electro-rheological fluid 2 changes. In this case, the damper device 1 can adjust a characteristic of the generated damping force (damping force characteristic) continuously from a hard characteristic to a soft characteristic in response to the voltage applied to the electrode tube 18. Incidentally, the damper device 1 may be capable of adjusting the damping force characteristic not continuously but in two or more stages.

Meanwhile, the electro-rheological fluid 2 flows into the electrode passage 19 from the rod-side oil chamber B through the oil hole 3A by the compression stroke and the extension stroke of the piston 6, but at this time, the electro-rheological fluid 2 entrains the gas in the damper device 1. As a result, bubbles are generated in the electro-rheological fluid 2. In the damper device using the electro-rheological fluid 2, a high voltage of 3,000 V or more is applied to the electro-rheological fluid 2 located between the electrode tube 18 serving as the anode and the inner tube 3 serving as the cathode, and there is a case where arc discharge in which a large current flows between the electrode tube 18 and the inner tube 3 is generated due to the bubbles generated in the electro-rheological fluid 2. Generally, it is said that dielectric strength of air is about 3,000 V/mm (when humidity is not taken into consideration), and dielectric breakdown occurs in which an insulation resistance becomes almost zero if the voltage exceeds the dielectric strength. The arc discharge caused by the dielectric breakdown is generated at a location where the bubbles (air) are generated in the electro-rheological fluid 2. When the arc discharge is generated, there are problems that the damper device becomes uncontrollable, the electrodes are consumed, and the electro-rheological fluid 2 deteriorates.

Figure 3A:
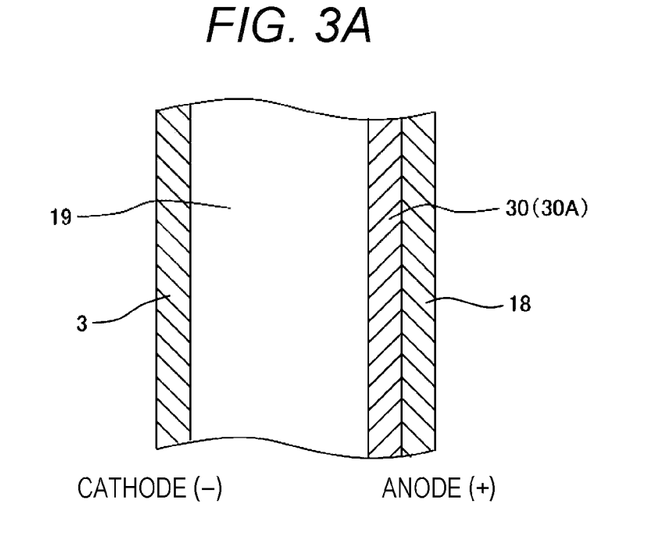
FIG. 3A is an enlarged view of Part III of FIG. 1 according to the first embodiment of the present invention.
Figure 3B:
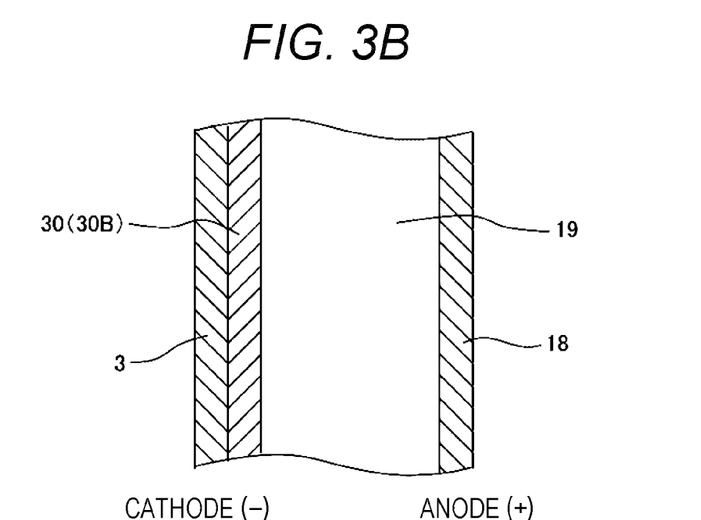
FIG. 3B is an enlarged view of Part III of FIG. 1 according to the first embodiment of the present invention.

Hereinafter, a configuration for solving these problems will be described with reference to FIGS. 3 to 6. FIGS. 3A and 3B are enlarged views of Part III of FIG. 1.

In FIG. 3A, an electrode passage 19 is formed between the inner tube 3 and the electrode tube 18, and the electrode passage 19 contains the electro-rheological fluid 2 as a working fluid. An inter-electrode distance (distance between the anode and the cathode) between the inner tube 3 and the electrode tube 18 is generally set to 0.4 to 1.6 mm, and is set to 0.8 mm in the present embodiment. For this reason, when the high voltage of 3,000V or more is applied between the inner tube 3 and the electrode tube 18, the arc discharge is likely to be generated due to the bubbles (air) in the electro-rheological fluid 2. Therefore, an insulating layer 30 (30A) is formed on an inner surface of the electrode tube 18 serving as the anode in order to suppress the generation of arc discharge in the present embodiment. The insulating layer 30A is formed on the surface of the electrode tube 18 on a side facing the inner tube 3. In other words, the insulating layer 30A is provided on a surface of the anode on a side facing the cathode.

As a material for the insulating layer, any of inorganic insulating materials, such as alumina, sapphire, mullite, cordierite, steatite, forsterite, yttria, titania, silicon carbide, silicon nitride, aluminum nitride, zirconia, and cermet, is used. Further, a composite material in which the above-described inorganic insulating material and a resin material are mixed may be used as the organic-inorganic insulating material.

The above-described inorganic insulating material and organic-inorganic insulating material can be stacked on an electrode using a chemical vapor deposition (CVD) method, a plasma CVD method, an ion beam CVD method, a slurry coating method, a spin casting method, a liquid phase deposition (LPD) method, a thermal spraying method, an aerosol deposition (AD) method, a powder coating method, or the like.

It is conceivable to use an organic material as the material of the insulating layer, but the organic material has a smaller relative dielectric constant than the inorganic material. Thus, if the organic material is used alone for the insulating layer, an electric field applied to the electro-rheological fluid decreases so that the electro-rheological effect decreases. Therefore, it is necessary to increase the applied voltage in order to exhibit the same electro-rheological effect as when there is no insulating layer. When the organic material is used for the insulating layer, it is preferable to put an inorganic material having a high dielectric constant in the organic material to increase the dielectric constant as the organic-inorganic composite material in order to increase the electric field applied to the electro-rheological fluid.

Further, the above-described thermal spraying method is used as a method for forming the inorganic material on the electrode, and a porous portion is generated in the insulating layer in the case of using the thermal spraying method. For this reason, it is necessary to form the insulating layer thicker than the organic material in order to withstand the arc discharge. When the organic-inorganic composite material is used as the insulating layer, a breakdown voltage of the insulating layer can be increased, and further, the insulating layer can be formed as a thinner layer than the case of forming the insulating layer using the inorganic material alone.

Further, when the insulating layer is formed using the organic-inorganic composite material, a method such as applying a resin (organic material) containing an inorganic filler and dipping is used. When such a method is used, it is unnecessary to use a special device used in the thermal spraying method, and the insulating layer can be easily formed.

Figure 4:
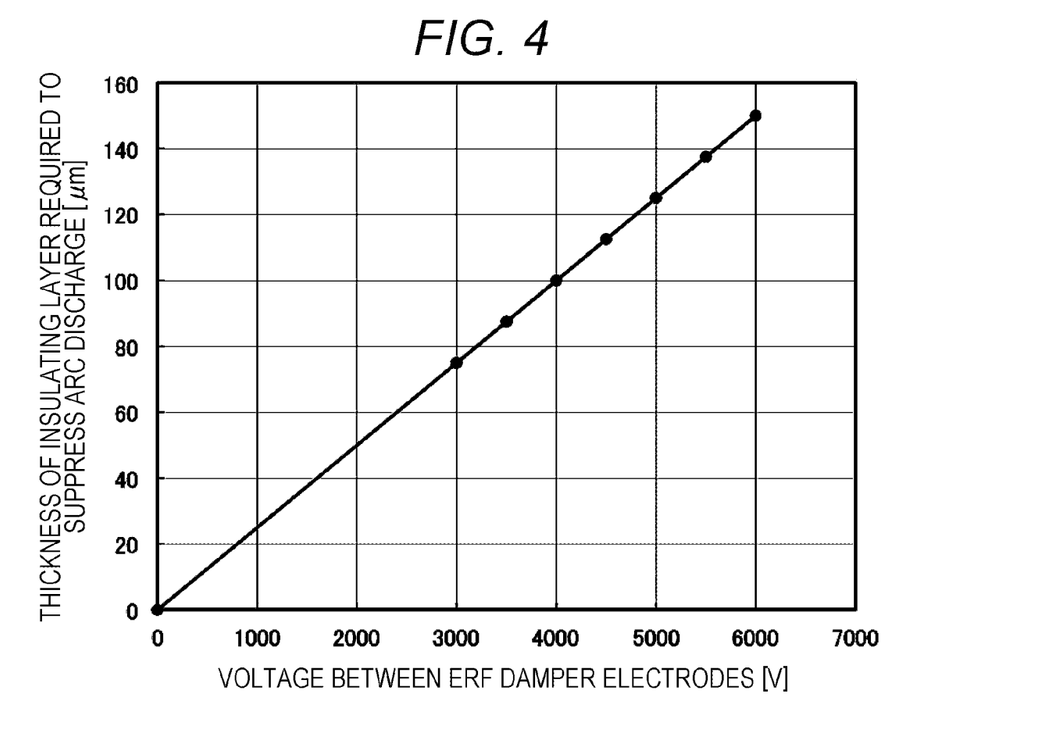
FIG. 4 is a view illustrating a relationship between a thickness (μm) of an insulating layer required to suppress arc discharge and a voltage (V) between electro-rheological fluid (ERF) damper electrodes.

In order to suppress the arc discharge caused by the dielectric breakdown, the thickness of the insulating layer 30A is important. Hereinafter, a relationship between a voltage between electrodes and the thickness of the insulating layer 30A will be described with reference to FIG. 4. FIG. 4 is a view illustrating the relationship between the thickness (μm) of the insulating layer required to suppress the arc discharge and the voltage (V) between the electro-rheological fluid 2 (ERF) damper electrodes.

In FIG. 4, the distance between the inner tube 3 and the electrode tube 18 of the electro-rheological fluid 2 (ERF) damper is set to 0.8 mm. In FIG. 4, when the voltage (V) between the electro-rheological fluid 2 (ERF) damper electrodes, that is, the voltage (V) between the inner tube 3 and the electrode tube 18 is 3,000 V, the thickness of the insulating layer required to suppress the arc discharge is 75 μm. Further, when the voltage (V) between the inner tube 3 and the electrode tube 18 is 4,000 V, the thickness (μm) of the insulating layer required to suppress the arc discharge is 100 μm.

Similarly, when the voltage (V) between the inner tube 3 and the electrode tube 18 is 5,000 V, the thickness (μm) of the insulating layer required to suppress the arc discharge is 125 μm. It is understood that the relationship between the thickness of the insulating layer and the voltage is almost proportional. Assuming that the thickness of the insulating layer required to suppress the arc discharge is t (m) and the maximum voltage applied to the electro-rheological fluid 2 is Vmax (V), the following Formula (1) can be derived.

$$t \geq 2.5 \times 10^{-8} \times V\text{max} \quad (1)$$

The thickness of the insulating layer required to suppress the arc discharge also changes depending on the distance between the electrodes. For example, when the distance between the inner tube 3 and the electrode tube 18 is 1.6 mm, an inclination decreases as compared to that on the line in FIG. 4 where the distance between the inner tube 3 and the electrode tube 18 is 0.8 mm, and the voltage at which the dielectric breakdown occurs also rises. Thus, the arc discharge can be suppressed if the condition of the above Formula (1) is satisfied.

On the other hand, when the distance between the inner tube 3 and the electrode tube 18 is 0.4 mm, the inclination becomes larger than that on the line in FIG. 4 where the distance between the inner tube 3 and the electrode tube 18 is 0.8 mm, and it is necessary to make the insulating layer thick in order to satisfy the condition of the above Formula (1). However, when the insulating layer is made thicker, the electric field applied to the electro-rheological fluid 2 decreases, and the electro-rheological effect also decreases. A relationship between the thickness of the insulating layer and the electric field will be described with reference to FIG. 5.

Figure 5:
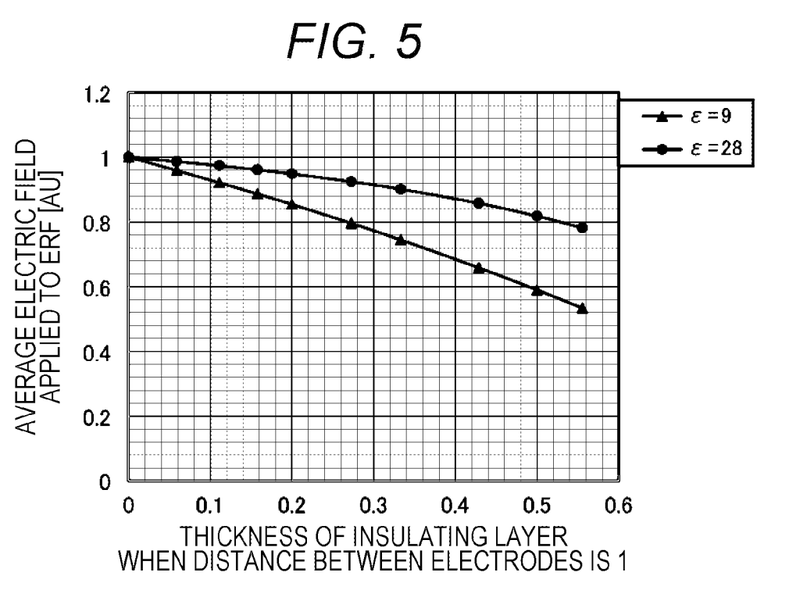
FIG. 5 is a view illustrating a relationship between the thickness of the insulating layer and an average electric field applied to the electro-rheological fluid when a distance between the electrodes is 1.

FIG. 5 is a view illustrating the relationship between the thickness of the insulating layer when the distance between the electrodes is 1, and an average electric field (AU: arbitrary unit) applied to the electro-rheological fluid 2 (ERF). FIG. 5 illustrates data of alumina (relative dielectric constant ε=9) and zirconia (relative dielectric constant ε=28).

In FIG. 5, when the thickness of the insulating layer increases, the average electric field applied to the electro-rheological fluid 2 decreases. When the electric field applied to the electro-rheological fluid 2 decreases, the effect as the electro-rheology decreases. In order to ensure the effect as the electro-rheology, it is desirable to ensure the average electric field applied to the electro-rheological fluid 2 (ERF) to be at least 0.6 (60%) or more. Alumina has a larger drop in the average electric field with the increase in the thickness of the insulating layer as compared with zirconia. In the case of alumina (relative dielectric constant ε=9), the average electric field is lower than 0.6 (60%) if the insulating layer thickness exceeds 0.5 when the distance between the electrodes is 1. Therefore, the thickness of the insulating layer is set to 0.5 or less when the distance between the electrodes (the distance between the anode and the cathode) is 1 in the present embodiment. However, the thickness of the insulating layer needs to be a predetermined thickness, the thickness of the insulating layer in the present embodiment is set to 0.12 or more when the distance between the electrodes (the distance between the anode and the cathode) is 1. As a result, the effect as the electro-rheology can be ensured in the present embodiment.

Further, the relative dielectric constant of the insulating layer is set to be greater than the relative dielectric constant of the electro-rheological fluid 2 in order to apply a higher electric field to the electro-rheological fluid 2 in the present embodiment. The electro-rheological fluid 2 is configured by dispersing polyurethane (relative dielectric constant ε=6.0) particles and the like in base oil made of, for example, silicone oil (relative dielectric constant ε=2.6). With this configuration, the decrease in the electric field applied to the electro-rheological fluid 2 can be suppressed in the present embodiment.

Figure 6:
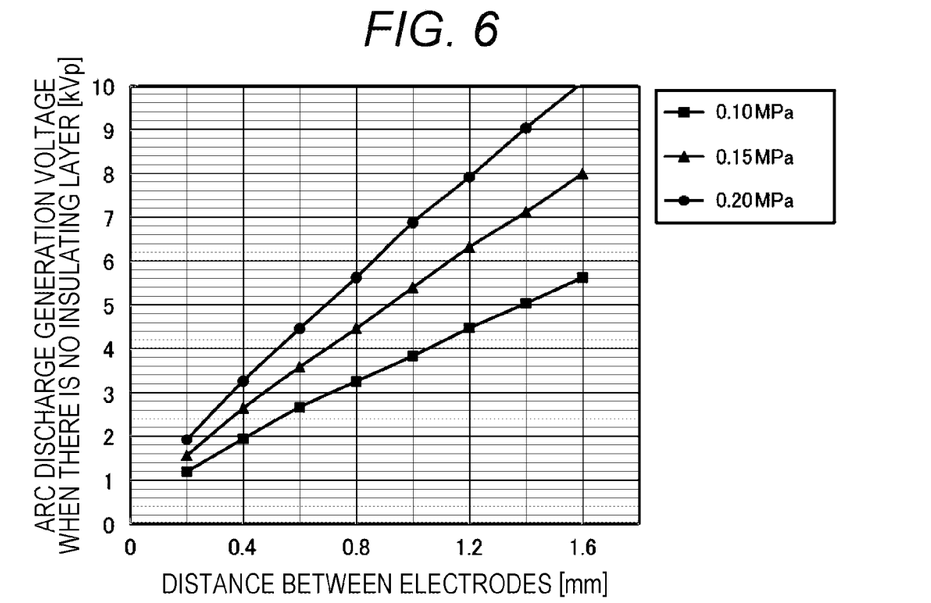
FIG. 6 is a view illustrating a relationship between the distance between the electrodes (mm) and an arc discharge generation voltage (kVp) when there is no insulating layer.

Next, the relationship between the distance between electrodes (mm) and an arc discharge generation voltage (kVp) when there is no insulating layer will be described with reference to FIG. 6. FIG. 6 is a view illustrating a relationship between the distance between the electrodes (mm) and the arc discharge generation voltage (kVp) when there is no insulating layer according to the first embodiment of the present invention. FIG. 6 illustrates states where the internal pressure in the damper device 1 is 0.10 MPa (atmospheric pressure), 0.15 MPa, and 0.20 MPa. In the present embodiment, the maximum value of the internal pressure in the damper device 1 is set to 0.20 MPa.

In FIG. 6, a peak value of the arc discharge generation voltage increases as the internal pressure in the damper device 1 becomes higher. In the present embodiment, the peak value of the arc discharge generation voltage (kVp) in the case of providing is no insulating layer when the internal pressure of the damper device 1 is 0.20 MPa and the distance between the electrodes is 1.6 mm is 10,000 V (10 KV). In the present embodiment, an upper limit of the peak value of the arc discharge generation voltage (kVp) when there is no insulating layer is set to 10,000 V (10 KV) or less considering that the internal pressure of the damper device 1 is 0.20 MPa and the damper device 1 with the distance between the electrodes being 1.6 mm is used. In addition, when the voltage applied to the electrodes exceeds 10,000 V (10 KV), a size of a device configured to generate a high voltage increases or it is necessary to make a power cable thick, which is not preferable as a device to be mounted on a vehicle or the like. Therefore, the upper limit of the peak value of the arc discharge generation voltage (kVp) when there is no insulating layer is set to 10,000V (10 KV) or less in the present embodiment. Further, a lower limit of the peak value of the arc discharge generation voltage (kVp) when there is no insulating layer is set to 3,000V (3 kV) or less. Oil such as silicone oil is sealed in the electro-rheological fluid 2, and 3,000V (3 kV) is required to apply the electric field to the oil. Therefore, the maximum voltage applied between the electrodes is set in a range of 3,000V (3 kV) to 10,000V (10 kV) in the present embodiment. As a result, the electric field applied to the electro-rheological fluid 2 can be ensured in the present embodiment.

As described above, the maximum voltage applied between the electrodes is set in the range of 3,000V (3 kV) to 10,000V (10 kV) in the present embodiment. When this range is applied to Formula (1), the thickness t (m) of the insulating layer is 75 µm to 250 mm. The distance between the electrodes of the anode and the cathode is 1.6 mm at the maximum in the present embodiment with the upper limit of the thickness t (m) of the insulating layer. In order to ensure the average electric field to be 0.6 (60%) or more when the distance between the electrodes of 1.6 mm is 1, it is necessary to set 0.5 or less of the distance between the electrodes of 1.6 mm, the upper limit of the thickness t (m) of the insulating layer is set to 0.8 mm (800 µm). Therefore, the thickness t (m) of the insulating layer in the present embodiment is set to 75 µm to 800 µm.

As described above, the thickness t (m) of the insulating layer is set so as to satisfy, $$t \geq 2.5 \times 10^{-8} \times V\text{max} \quad (1)$$

when the thickness of the insulating layer required to suppress the arc discharge is t (m) and the maximum voltage applied to the electro-rheological fluid 2 is Vmax (V) according to the present embodiment. Thus, it is possible to suppress the arc discharge generated between the inner tube 3 and the electrode tube 18 serving as both the electrodes, and to suppress control failure of the damper device 1, consumption of the electrodes, and deterioration of the electro-rheological fluid 2.

Further, the thickness of the insulating layer is set to 0.5 or less when the distance between the electrodes (distance between the anode and the cathode) is 1 according to the present embodiment, and thus, the effect as electro-rheology can be ensured.

Further, the relative dielectric constant of the insulating layer is made larger than the relative dielectric constant of the electro-rheological fluid 2 according to the present embodiment, and thus, it is possible to suppress the decrease in the electric field applied to the electro-rheological fluid 2.

Further, the voltage of 3,000 V (3 kv) or more is applied between the inner tube 3 and the electrode tube 18 serving as both the electrodes according to the present embodiment, and thus, it is possible to apply the electric field to the oil of the electro-rheological fluid 2 and to ensure the electric field applied to the electro-rheological fluid 2. Further, the voltage between the inner tube 3 and the electrode tube 18 serving as both the electrodes is set to 10,000 V (10 kv) or less according to the present embodiment, and thus, it is possible to suppress the size increase of the device or parts configured to generate a high voltage.

Further, the distance between the electrode tube 18 (anode) and the inner tube 3 (cathode) is set to 0.4 mm to 1.6 mm according to the present embodiment, and thus, it is possible to ensure the electric field applied to the electro-rheological fluid 2 while suppressing the size increase of the device or parts configured to generate a high voltage.

Furthermore, the thickness t (m) of the insulating layer is 75 µm to 800 µm according to the present embodiment, and thus, it is possible to suppress the arc discharge without increasing the thickness of the insulating layer more than necessary, and further, it is possible to suppress the decrease in the electric field applied to the electro-rheological fluid 2.

The insulating layer 30 (30A) is formed on the inner surface of the electrode tube 18 serving as the anode in the embodiment of FIG. 3A described above. Regarding the insulating layer 30, however, the insulating layer 30 (30B) may be formed on the outer peripheral surface of the inner tube 3 as illustrated in FIG. 3B. The insulating layer 30B is formed on a surface on a side facing the electrode tube 18. In other words, the insulating layer 30B is provided on a surface of the cathode on a side facing the anode. Even when the insulating layer 30B is formed on the inner tube 3, the same configuration as that obtained by forming the insulating layer 30A on the electrode tube 18 is adopted, and the same effect is achieved. In addition, when the insulating layer 30B is formed on the inner tube 3, the insulating layer 30B is formed on the outer peripheral surface of the tube, so that the workability to form the insulating layer 30B can be improved.

In the present embodiment, the insulating layer 30 may be formed on either the inner tube 3 (cathode) or the electrode tube 18 (anode).

Second Embodiment

Figure 7:
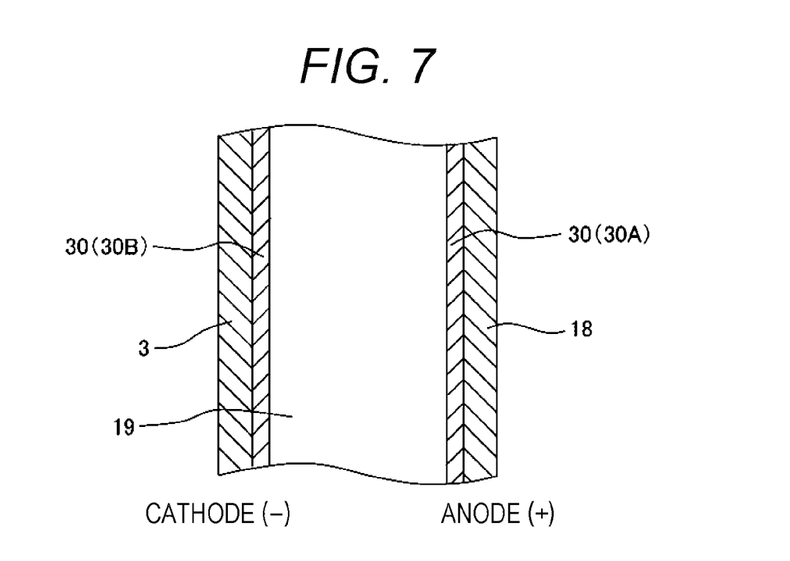
FIG. 7 is an enlarged view of Part III of FIG. 1 according to a second embodiment of the present invention.

Next, a second embodiment of the present invention will be described with reference to FIG. 7. FIG. 7 is an enlarged view of Part III of FIG. 1 according to the second embodiment of the present invention.

FIG. 7 differs from the first embodiment in terms that the insulating layer 30 is provided on both the inner tube 3 (cathode) and the electrode tube 18 (anode).

The insulating layer 30A is formed on the inner peripheral surface of the electrode tube 18, and the insulating layer 30B is formed on the outer peripheral surface of the inner tube 3. The insulating layers 30A and 30B are configured to face each other.

Even in the second embodiment, the thickness t (m) of the insulating layer 30 is set so as to satisfy Formula (1). as in the first embodiment $$t \geq 2.5 \times 10^{-8} \times V\text{max} \quad (1)$$

When forming the insulating layers 30, it is unnecessary to form each of the insulating layer 30A and the insulating layer 30B so as to satisfy Formula (1), and it suffices that the total value of the insulating layers 30A and 30B satisfies the Formula (1).

When forming the insulating layer 30A and the insulating layer 30B on the electrode tube 18 and the inner tube 3, respectively, the insulating layer 30A and the insulating layer 30B may be formed to have the same thickness.

Alternatively, the layers may be formed to have different thicknesses such that, for example, the thickness of the insulating layer 30A may be ⅓, and the thickness of the insulating layer 30B may be ⅔.

The second embodiment has the same advantages as the first embodiment. In addition, the thickness of the insulating layer 30 can be reduced as compared with the case where the insulating layer 30 is formed only on the electrode tube 18 or the inner tube 3 so that the insulating layer 30 can be formed more stably since the insulating layer 30A and the insulating layer 30B are formed on the electrode tube 18 and the inner tube 3, respectively, according to the second embodiment.

Third Embodiment

Figure 8:
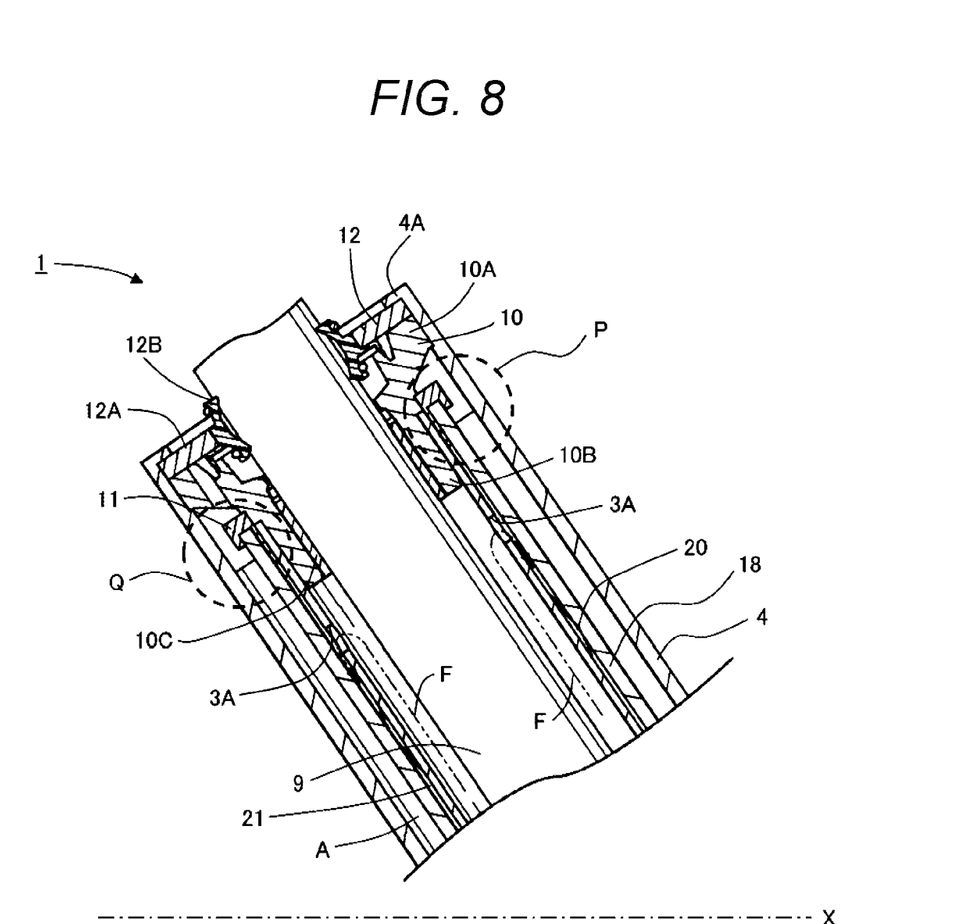
FIG. 8 is a longitudinal cross-sectional view illustrating a damper device according to a third embodiment of the present invention.

Next, a third embodiment of the present invention will be described with reference to FIG. 8. FIG. 8 is a longitudinal cross-sectional view of a damper device according to the third embodiment of the present invention.

The damper device mounted on a vehicle has a different attachment form depending on a model. For example, as illustrated in FIG. 8, an axial direction of the piston rod 9 of the damper device may be installed so as to be inclined from a position perpendicular to a horizontal reference line X.

Bubbles generated in the damper device 1 by a compression stroke and an extension stroke of the piston 6 have a lower specific gravity than oil of the electro-rheological fluid 2, and thus, are generated in an upper portion of the damper device 1. In the case of FIG. 8, a position P is at a position higher than a position Q, the bubbles are generated at the position P in the damper device 1. Therefore, the insulating layer 30 is formed in a portion (part) at the position P where the bubbles are generated in the present embodiment. The insulating layer 30 has the same configuration as that in the first and second embodiments, and the same effect is achieved.

In addition, the insulating layer 30 is formed in a part of the electrode where the bubbles are generated according to the present embodiment, and thus, cost can be reduced as compared with the case where the insulating layer 30 is formed on the entire electrode. Further, working time required to form the insulating layer 30 can be shortened, and the workability can be improved.

Incidentally, the example in which the axial direction of the piston rod 9 of the damper device is installed so as to be inclined from a vertical position with respect to the horizontal reference line X has been described in the present embodiment, but the invention can be also applied to a damper device installed such that an axial direction of the piston rod 9 of the damper device is at a position perpendicular to the horizontal reference line X. Even in such a case, it is preferable to form the insulating layer 30 in an upper portion of the electrode where bubbles are generated (at a position higher than half of an overall length of the anode or the cathode).

Incidentally, the present invention is not limited to the above-described respective embodiments, and includes various modifications.

The above-described embodiments have been described in detail in order to describe the present invention in an easily understandable manner, and are not necessarily limited to one including the entire configuration that has been described above.

Further, the electrode tube 18 is used as one of the electrodes in the respective embodiments of the present invention, but the electrode may be configured using a plate-like member instead of the electrode tube 18. In the present invention, the plate-like electrode is also included in the technical concept of the electrode tube 18.

REFERENCE SIGNS LIST

1 damper device
2 electro-rheological fluid
3 inner tube
4 outer tube
5 bottom cap
6 piston
9 piston rod
18 electrode tube
19 electrode passage
30 insulating layer
30A insulating layer
30B insulating layer

The invention claimed is:

1. A damper device comprising:
a piston rod;
an outer tube housing the piston rod;
an electro-rheological fluid provided between the outer tube and the piston rod; and
a voltage applying mechanism that is provided between the outer tube and the piston rod and applies a voltage to the electro-rheological fluid,
wherein
the voltage applying mechanism includes an anode and a cathode,
the electro-rheological fluid is located between the anode and the cathode,
an insulating layer is provided on a surface of the anode on a side facing the cathode or on a surface of the cathode on a side facing the anode, and
a thickness t (m) of the insulating layer satisfies following Formula (1) when a maximum voltage applied to the electro-rheological fluid is Vmax (V), $$t \geq 2.5 \times 10^{-8} \times V\text{max} \qquad \text{Formula (1)}$$

2. The damper device according to claim 1, wherein
a distance between the anode and the cathode is set to 0.4 mm to 1.6 mm.
3. The damper device according to claim 2, wherein
the maximum voltage is set to 3 kV or more.
4. The damper device according to claim 2, wherein
the maximum voltage is set to 3 kV to 10 kV.
5. The damper device according to claim 4, wherein
the thickness t (m) of the insulating layer is set in a range of 75 μm to 800 μm.
6. The damper device according to claim 1, wherein
the thickness of the insulating layer is 0.5 or less when a distance between the anode and the cathode is 1.
7. The damper device according to claim 1, wherein
a relative dielectric constant of the insulating layer is higher than a relative dielectric constant of the electro-rheological fluid.
8. The damper device according to claim 1, wherein
the insulating layer is provided on both the anode and the cathode.
9. The damper device according to claim 1, wherein
the insulating layer is provided at a position higher than half of an overall length of the anode or the cathode.
10. The damper device according to claim 1, further comprising:
an inner tube that is provided between the piston rod and the outer tube and houses the piston rod; and
an electrode tube provided between the inner tube and the outer tube,
wherein each of the inner tube and the electrode tube is provided with the anode and the cathode.

11. The damper device according to claim 1, wherein the insulating layer is made of any of alumina, sapphire, mullite, cordierite, steatite, forsterite, yttria, titania, silicon carbide, silicon nitride, aluminum nitride, zirconia, and cermet.

* * * * *